(12) United States Patent
Wei

(10) Patent No.: US 8,320,835 B2
(45) Date of Patent: Nov. 27, 2012

(54) METHOD AND DEVICE FOR DETERMINING CHANNEL FEEDBACK INFORMATION IN LTE SYSTEM

(75) Inventor: Jingxin Wei, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/297,056

(22) Filed: Nov. 15, 2011

(65) Prior Publication Data
US 2012/0058732 A1 Mar. 8, 2012

Related U.S. Application Data

(63) Continuation of application No. PCT/CN2010/072613, filed on May 11, 2010.

(30) Foreign Application Priority Data

May 15, 2009 (CN) .......................... 2009 1 0084242

(51) Int. Cl.
H04B 1/00 (2006.01)
(52) U.S. Cl. ................. 455/63.1; 455/67.11; 455/562.1; 455/509; 455/501; 455/515; 375/229; 375/260; 375/267; 375/259; 375/132
(58) Field of Classification Search ................. 455/63.1, 455/67.11, 69, 101, 132–141, 509, 501, 515, 455/562.1; 370/280, 252, 278, 281, 230, 370/203; 375/260, 267, 229, 259, 285
See application file for complete search history.

(56) References Cited

U.S. PATENT DOCUMENTS 7,702,029 B2 * 4/2010 Kotecha et al. ............... 375/267
2007/0147535 A1 * 6/2007 Niu et al. ...................... 375/267
(Continued)

FOREIGN PATENT DOCUMENTS

| CN | 101568145 A | 10/2009 |
|---|---|---|
| CN | 101599788 A | 12/2009 |
| WO | WO 2008132688 A2 | 11/2008 |
| WO | WO 2010/130192 A1 | 11/2010 |

OTHER PUBLICATIONS

Written Opinion of the Internatioanl Searching Authority in corresponding PCT Application No. PCT/CN2010/072613 (Aug. 19, 2010).

(Continued)

*Primary Examiner* — Matthew Anderson
*Assistant Examiner* — Ganiyu A Hanidu
(74) *Attorney, Agent, or Firm* — Leydig, Voit & Mayer, Ltd.

(57) ABSTRACT

A method and a device for determining channel feedback information in a Long Term Evolution (LTE) system are provided. The method includes: obtaining an $(N-1)^{th}$ layer interference-plus-noise matrix in an LTE system, and obtaining an $N^{th}$ layer interference-plus-noise matrix according to the $(N-1)^{th}$ layer interference-plus-noise matrix; and then, calculating a Signal to Interference plus Noise Ratio (SINR) corresponding to the $N^{th}$ layer interference-plus-noise matrix according to the $N^{th}$ layer interference-plus-noise matrix, and determining channel feedback information according to the SINR. It can be seen that, in the embodiments of the present invention, in a processing manner, a current layer interference-plus-noise matrix is calculated according to an obtained previous layer interference-plus-noise matrix through calculation in a calculation process of the channel feedback information, thus effectively reducing the calculation amount in the calculation process of the channel feedback information.

7 Claims, 1 Drawing Sheet

U.S. PATENT DOCUMENTS

2008/0055414 A1* 3/2008 Mican ............................ 348/195
2009/0196203 A1* 8/2009 Taira et al. .................... 370/280
2009/0202014 A1* 8/2009 Mujtaba et al. ............... 375/267
2010/0167657 A1* 7/2010 Molnar et al. ............. 455/67.11
2010/0239036 A1* 9/2010 Koo et al. ..................... 375/260
2011/0032839 A1* 2/2011 Chen et al. .................... 370/252

OTHER PUBLICATIONS

International Search Report in corresponding PCT Application No. PCT/CN2010/072613 (Aug. 19, 2010).

* cited by examiner

METHOD AND DEVICE FOR DETERMINING CHANNEL FEEDBACK INFORMATION IN LTE SYSTEM

CROSS-REFERENCE TO RELATED APPLICATIONS

This application is a continuation of International Application No. PCT/CN2010/072613, filed May 11, 2010, which claims priority to Chinese Patent Application No. 200910084242.2, filed May 15, 2009. The aforementioned patent applications are hereby incorporated by reference in their entireties.

FIELD OF THE INVENTION

The present invention relates to the field of communications technologies, and in particular, to a method and a device for determining channel feedback information in a Long Term Evolution (LTE) system.

BACKGROUND OF THE INVENTION

In an LTE system, a Multi-Input Multi-Output (MIMO) technology and a Precoding technology are adopted to increase system capacity. Specifically, one or more layers of data is precoded and then transmitted by using a multi-antenna configuration on a transmitting end. According to different channel conditions, the transmitting end may automatically adjust the number of layers of the transmitted data and a precoding matrix, so as to achieve the objective of increasing the system capacity.

At a transmitting end, downlink channel status information that includes Rank Indication (RI) and a Precoding Matrix Indicator (PMI) may be specifically known through feedback from a receiving end. The RI is used to adjust the number of layers of data at the transmitting end. The PMI is an index in a codebook set of the precoding matrix known at the transmitting end and the receiving end, and is used to adjust the precoding matrix that is used at the transmitting end. It is specified in an LTE protocol that, in a single antenna port or a transmit diversity transmission mode, RI=1, and no PMI exists; and in a space multiplexing transmission mode, the receiving end needs to feed back a corresponding RI and PMI.

In an MIMO precoding model of the LTE system, a process of the receiving end determining the corresponding RI and PMI may specifically include: first calculating Signal to Interference plus Noise Ratios (SINRs) of all layers and all precoding matrices at each sub-carrier, and then calculating an approximate maximum value of a throughput of the system according to the obtained SINR, and finally using an RI and a PMI corresponding to the approximate maximum value of the throughput as the RI and PMI that are required to be fed back by the receiving end to the transmitting end.

A process for determining the SINR by calculation in the prior art is described in the following.

A model of receiving a signal at a sub-carrier in the LTE system is: y=HWx+n, where W is a precoding matrix having a dimensionality of $N_T \times v$, v is the number of layers, and H is a channel transmission matrix of $N_R \times N_T$.

Correspondingly, at the receiving end, a SINR of a $k^{th}$ (k=1, 2, ..., v) symbol may be determined specifically by using a Minimum Mean Square Error (MMSE) algorithm:

$$SINR_k(v, W) = \frac{1}{\sigma^2(\sigma^2 I_v + W^H H^H HW)_{kk}^{-1}} - 1;$$

where $(\sigma^2 I_v + W^H H^H HW)_{kk}^{-1}$ represents a $k^{th}$ diagonal element of a matrix $(\sigma^2 I_v + W^H H^H HW)^{-1}$ and means a sum of power of normalized signals and power of interference.

After each $SINR_k(v,W)$ is calculated in a codebook set of a corresponding layer, a precoding matrix and the number of layers may be selected according to a certain rule $$\underset{(v,W)}{\text{optimize}} f(SINR_k(v, W)),$$

where $f(\bullet)$ is a cost function, for example, may be a throughput. Taking as an example that a throughput is served as a cost function, an effective SINR corresponding to each codeword stream may be converted according to the obtained SINR by calculation, so as to obtain a Modulation and Code Scheme (MCS) corresponding to each codeword stream, and then an approximate throughput is calculated according to a coding rate and the MCS, which may specifically be:

$$\text{Throughput} = \sum_{i=1}^{q} N_i \cdot (M_i \cdot R_i)$$

where $N_i$ represents the number of layers to which an $i^{th}$ (i=1, 2, ..., q) codeword stream is mapped, $R_i$ represents a coding rate, and $M_i$ represents a modulation order.

After the corresponding approximate throughput is obtained by calculation, a PMI and an RI corresponding to the approximate maximum throughput may be selected as the PMI and RI that are fed back by the receiving end.

In the implementation of the present invention, the inventor finds that the prior art has at least the following problems.

In a joint estimation algorithm of the PMI and the RI, SINR values of all layers (v) and all precoding matrices (codebook indexes) at each sub-carrier need to be calculated. In the prior art, an inverse of a positive definite Hermite matrix needs to be calculated in a calculation process of each SINR. A corresponding process of calculating the inverse of the corresponding matrix is implemented by adopting a Cholesky decomposition manner, and the calculation amount for calculating an inverse of each matrix has a cubic magnitude of a matrix order v (v=1, 2, ..., the maximum number of layers). Obviously, the calculation amount in the corresponding calculation process is quite high.

SUMMARY OF THE INVENTION

Embodiments of the present invention provide a method and a device for determining channel feedback information in an LTE system, so as to reduce the calculation amount in a corresponding calculation process of the channel feedback information.

A method for determining channel feedback information in an LTE system includes:

obtaining an $(N-1)^{th}$ layer interference-plus-noise matrix in an LTE system, and obtaining an $N^{th}$ layer interference-plus-noise matrix according to the $(N-1)^{th}$ layer interference-plus-noise matrix; and calculating an SINR corresponding to the $N^{th}$ layer interference-plus-noise matrix according to the $N^{th}$ layer interference-plus-noise matrix, and determining channel feedback information according to the SINR, where N is an integer that is greater than 1.

A device for determining channel feedback information in an LTE system includes:

an interference-plus-noise matrix obtaining unit, configured to obtain an $(N-1)^{th}$ layer interference-plus-noise matrix in an LTE system, and obtain an $N^{th}$ layer interference-plus-noise matrix according to the $(N-1)^{th}$ layer interference-plus-noise matrix; and a channel feedback information determining unit, configured to calculate an SINR corresponding to the $N^{th}$ layer interference-plus-noise matrix according to the $N^{th}$ layer interference-plus-noise matrix obtained by an interference-plus-noise matrix obtaining unit through calculation, and determine channel feedback information according to the SINR, where N is an integer that is greater than 1.

It can be seen from the technical solutions provided in the preceding embodiments of the present invention that, in a processing manner, a current layer interference-plus-noise matrix is specifically calculated according to an obtained previous layer interference-plus-noise matrix through calculation in a calculation process of channel feedback information, thus effectively reducing the calculation amount in the calculation process of the channel feedback information.

BRIEF DESCRIPTION OF THE DRAWINGS

To describe the technical solutions in the embodiments of the present invention more clearly, the accompanying drawings required for describing the embodiments are introduced briefly in the following. Apparently, the accompanying drawings in the following description are only some embodiments of the present invention, and persons of ordinary skill in the art may also derive other drawings from these accompanying drawings without creative efforts.

DETAILED DESCRIPTION OF THE EMBODIMENTS

Figure 1:
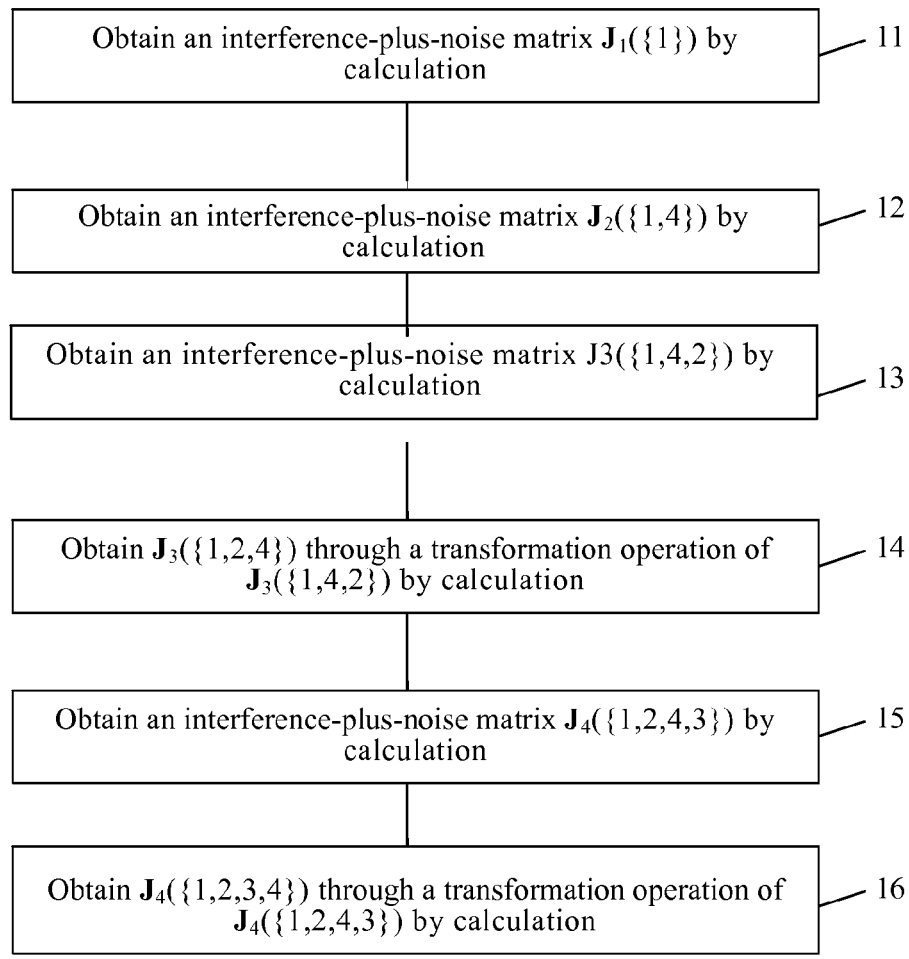
FIG. 1 is a schematic diagram of a process for calculating an interference-plus-noise matrix according to an embodiment of the present invention.

The technical solutions in the embodiments of the present invention are clearly and fully described in the following with reference to the accompanying drawings. It is obvious that the embodiments to be described are only a part rather than all of the embodiments of the present invention. Based on the embodiments of the present invention, all other embodiments obtained by persons of ordinary skill in the art without creative efforts shall fall within the protection scope of the present invention.

In an embodiment of the present invention, a corresponding solution for determining channel feedback information in an LTE system may include: first, obtaining an $(N-1)^{th}$ layer interference-plus-noise matrix in the LTE system, and obtaining an $N^{th}$ layer interference-plus-noise matrix according to the $(N-1)^{th}$ layer interference-plus-noise matrix; and then calculating an SINR corresponding to the $N^{th}$ layer interference-plus-noise matrix according to the $N^{th}$ layer interference-plus-noise matrix, and determining channel feedback information according to the corresponding SINR, where N is an integer that is greater than 1, and the corresponding channel feedback information may include a PMI and an RI.

Specifically, in the embodiment of the present invention, a different process of calculating an inverse of each matrix $\sigma^2 I_v + W^H H^H HW$ is adopted in a process of calculating each $SINR_k(v,W)$, so as to reduce the corresponding calculation amount.

Specifically, to facilitate derivation and calculation, it may be assumed that $\sigma^2=1$, so that $SINR_k(v,W)$ needed to be calculated is converted into a process of solving $(I_v + W^H H^H HW)_{kk}^{-1}$ (k=1, 2, ..., v).

In a codebook set list, because when $v_1 < v_2$, a column label set $\{s_1, \ldots, s_{v_1}\} \subset \{t_1, \ldots, t_{v_2}\}$ (a non-sequential set), that is, each column of a precoding matrix of a layer with a smaller number must be included in each column of a precoding matrix of a layer with a larger number. In this way, when the PMI and the RI are jointly estimated, a corresponding simplified calculation process may be adopted based on this feature to calculate $SNR_k(v,W)$ of all layers and all precoding matrices.

First, a calculation formula that needs to be used in the corresponding simplified calculation process is derived as follows.

Specifically, it may be assumed that $H=[h_1, h_2, \ldots, h_n]$ is a m×n matrix, if $H_v=[h_1, h_2, \ldots, h_v]$, $1 \leq v \leq n$, and $J_v(I_v + H_v^H H_v)^{-1}$, then:

$$J_v = (I_v + H_v^H H_v)^{-1} = \left( \begin{bmatrix} I_{v-1} & 0 \\ 0 & 1 \end{bmatrix} + [H_{v-1}\ h_v]^H [H_{v-1}\ h_v] \right)^{-1} =$$

$$\left( \begin{bmatrix} I_{v-1} + H_{v-1}^H H_{v-1} & H_{v-1}^H h_v \\ h_v^H H_{v-1} & 1 + h_v^H h_v \end{bmatrix} \right)^{-1}.$$

If $\alpha = H_{v-1}^H h_v$, and $b = 1 + h_v^H h_v$, then $$J_v = \begin{bmatrix} J_{v-1}^{-1} & \alpha \\ \alpha^H & b \end{bmatrix}^{-1}.$$

If
$$\begin{bmatrix} I_{v-1} & 0 \\ -\alpha^H J_{v-1} & 1 \end{bmatrix} \begin{bmatrix} J_{v-1}^{-1} & \alpha \\ \alpha^H & b \end{bmatrix} \begin{bmatrix} I_{v-1} & -J_{v-1}\alpha \\ 0 & 1 \end{bmatrix} = \quad (1)$$

$$\begin{bmatrix} J_{v-1}^{-1} & 0 \\ 0 & b - \alpha^H J_{v-1}\alpha \end{bmatrix},$$

then:

$$J_v = \begin{bmatrix} J_{v-1}^{-1} & \alpha \\ \alpha^H & b \end{bmatrix}^{-1}$$

$$= \begin{bmatrix} I_{v-1} & -J_{v-1}\alpha \\ 0 & 1 \end{bmatrix} \begin{bmatrix} J_{v-1}^{-1} & 0 \\ 0 & b - \alpha^H J_{v-1}\alpha \end{bmatrix}^{-1} \begin{bmatrix} I_{v-1} & 0 \\ -\alpha^H J_{v-1} & 1 \end{bmatrix}$$

$$= \begin{bmatrix} I_{v-1} & -J_{v-1}\alpha \\ 0 & 1 \end{bmatrix} \begin{bmatrix} J_{v-1} & 0 \\ 0 & (b-\alpha^H J_{v-1}\alpha)^{-1} \end{bmatrix} \begin{bmatrix} I_{v-1} & 0 \\ -\alpha^H J_{v-1} & 1 \end{bmatrix}$$

$$= \begin{bmatrix} J_{v-1} & -(b-\alpha^H J_{v-1}\alpha)^{-1} J_{v-1}\alpha \\ 0 & (b-\alpha^H J_{v-1}\alpha)^{-1} \end{bmatrix} \begin{bmatrix} I_{v-1} & 0 \\ -\alpha^H J_{v-1} & 1 \end{bmatrix}$$

$$= \begin{bmatrix} J_{v-1} + (b-\alpha^H J_{v-1}\alpha)^{-1}(J_{v-1}\alpha)(J_{v-1}\alpha)^H & -(b-\alpha^H J_{v-1}\alpha)^{-1} J_{v-1}\alpha \\ (-(b-\alpha^H J_{v-1}\alpha)^{-1} J_{v-1}\alpha)^H & (b-\alpha^H J_{v-1}\alpha)^{-1} \end{bmatrix}.$$

The preceding matrix is still a Hermite matrix, and it is assumed that $J_{v-1}$ has been calculated already, and the preceding formula (1) may be further converted into:

$$J_v = \begin{bmatrix} J_{v-1} + t_5 & -t_4 \\ -t_4^H & t_3 \end{bmatrix}; \quad (2)$$

Calculation manners of parameters in formula (2) respectively are:

$$\begin{cases} t_1 = J_{v-1}\alpha \\ t_2 = \alpha^H t_1 \\ t_3 = (b-t_2)^{-1} \\ t_4 = t_3 t_1 \\ t_5 = t_4 t_1^H. \end{cases} \quad (5)$$

Through formula (2), inverses of n matrices $J_v = (I_v + H_v^H H_v)^{-1}$ ($1 \leq v \leq n$) may be obtained through calculation, and the corresponding calculation amount (including only multiplication and division) of a $v^{th}$ inverse matrix $J_v$ respectively includes the following.

The calculation of $\alpha = H_{v-1}^H h_v$ requires $m(v-1)$ times of multiplication, and the calculation of $b = 1 + h_v^H h_v$ requires m times of multiplication; and the calculation of the parameter $t_1 = J_{v-1}\alpha$ requires $(v-1)^2$ times of multiplication, the calculation of $t_2 = \alpha^H t_1$ requires $(v-1)$ times of multiplication, the calculation of $t_3 = (b-t_2)^{-1}$ requires division once, the calculation of $t_4 = t_3 t_1$ requires $(v-1)$ times of multiplication, and the calculation of $t_5 = t_4 t_1^H$ (by using symmetry) requires $$\frac{v(v-1)}{2}$$

times of multiplication. Therefore, the total calculation amount of calculating $J_v$ is:

$$m(v-1) + m + (v-1)^2 + (v-1) + 1 + (v-1) + \frac{v(v-1)}{2} = \frac{3}{2}v^2 + \left(m - \frac{1}{2}\right)v.$$

It can be seen that the corresponding calculation amount is only a square magnitude.

It should be noted that $\sigma^2 = 1$ is not a requisite condition under which the obtained formula (2) through derivation is true, and assuming $\sigma^2 = 1$ is only for conveniently deriving the corresponding formula (2).

After obtaining the preceding formula (2), in the following, based on the obtained formula (2) through derivation, a corresponding calculation process of $SINR_k(v, W_n^{(s_1, \ldots, s_v)})$ from $\{s_1, s_2, \ldots, s_{v-1}\}$ to $\{s_1, s_2, \ldots, s_{v-1}, s_v\}$ in the embodiments of the present invention may include the following.

First, if $$HW_n = [h_1, h_2, \ldots, h_4] = H\left(I_4 - \frac{2}{u_n^H u_n} u_n u_n^H\right) = H - \frac{2}{u_n^H u_n}(Hu_n)u_n^H,$$

when the number of layers is v, $J_v(\{s_1, \ldots, s_v\}) = (I_v + (W_n^{(s_1, \ldots, s_v)})^H H^H HW_n^{(s_1, \ldots, s_v)})^{-1}$ needs to be calculated, at this time, specifically, if $d_k(v, \{s_1, \ldots, s_v\}) = (J_v(\{s_1, \ldots, s_v\}))_{kk}$, then $$SINR_k(v, W_n^{(s_1, \ldots, s_v)}) = \frac{1}{d_k(v, \{s_1, \ldots, s_v\})} - 1.$$

If $H_v(\{s_1, s_2, \ldots, s_v\}) = [h_{s_1}, h_{s_2}, \ldots, h_{s_v}]$, $1 \leq v \leq 4$, the following may be obtained according to formula (2):

an interference-plus-noise matrix $$\begin{aligned} J_v(\{s_1, \ldots, s_v\}) &= (I_v + (W_n^{(s_1, \ldots, s_v)})^H H^H HW_n^{(s_1, \ldots, s_v)})^{-1} \\ &= (I_v + [h_{s_1}, h_{s_2}, \ldots, h_{s_v}]^H [h_{s_1}, h_{s_2}, \ldots, h_{s_v}])^{-1} \\ &= \begin{bmatrix} J_{v-1}(\{s_1, s_2, \ldots, s_{v-1}\}) + t_5 & -t_4 \\ -t_4^H & t_3 \end{bmatrix} \end{aligned} \quad (3)$$

where, $\alpha = H_{v-1}^H(\{s_1, s_2, \ldots, s_{v-1}\})h_{s_v}$, $b = 1 + h_{s_v}^H h_{s_v}$, $$\begin{cases} t_1 = J_{v-1}(\{s_1, s_2, \ldots, s_{v-1}\})\alpha \\ t_2 = \alpha^H t_1 \\ t_3 = (b-t_2)^{-1} \\ t_4 = t_3 t_1 \\ t_5 = t_4 t_1^H. \end{cases}$$

It can be known from the preceding calculation results that, when a codebook index is fixed, $J_v$ determined by $\{s_1, s_2, \ldots, s_{v-1}, s_v\}$ may be obtained through recursion of $J_{v-1}$ determined by $\{s_1, s_2, \ldots, s_{v-1}\}$, thus obtaining $SINR_k$ $(v, W_n^{(s_1, \ldots, s_v)})$, that is, the calculation of $SINR_k(v, W_n^{(s_1, \ldots, s_v)})$ from $\{s_1, s_2, \ldots, s_{v-1}\}$ to $\{s_1, s_2, \ldots, s_{v-1}, s_v\}$ may be implemented by formula (3), so that the required calculation amount is only a square magnitude of a dimensionality of the matrix.

Furthermore, it can be known from the codebook set of the precoding matrix that not all column label sequential sets $\{s_1, s_2, \ldots, s_{v-1}\}$ of low layers meet $\{s_1, s_2, \ldots, s_{v-1}, s_v\}$ at high layers. For example, when index=0, a set changes from $\{1, 4\}$ to $\{1, 2, 4\}$ when v=2 changes to v=3. However, only the calculation from $\{1, 4\}$ to $\{1, 4, 2\}$ may be implemented through the preceding formula (3). Therefore, the corresponding conversion is required, so as to obtain $\{1, 2, 4\}$ through calculation of $\{1, 4, 2\}$. A corresponding conversion process is described in the following.

It is assumed that a column label sequential set of v−1 layers is $\{s_1, s_2, \ldots, s_{v-1}\}$, a column label sequential set of v layers is $\{q_1, q_2, \ldots, q_{v-1}, q_v\}$, and meets that $s_i = q_{\Pi(i)}$, $i=1, 2, \ldots, v-1$, the set $\{1, 2, \ldots, v-1\}$ is mapped to $\{1, 2, \ldots, v\}$ by injection $\Pi$. If $s_v = q_j$, where $j \in \{1, 2, \ldots, v\}$ and $j \notin \Pi(\{1, 2, \ldots, v-1\})$, it can be known that $s_v$ exists and is unique. Therefore, the sequential set $\{q_1, q_2, \ldots, q_{v-1}, q_v\}$ may be transformed into $\{s_1, s_2, \ldots, s_{v-1}, q_j\}$ through a transformation operation. It is assumed that a limited number of transformed matrices $P_i$ ($i=1, \ldots, K$) are set, then:

$$[h_{q_1}, h_{q_2}, \ldots, h_{q_{v-1}}, h_{q_v}] \cdot P_1 P_2 \ldots P_K = [h_{s_1}, h_{s_2}, \ldots, h_{s_{v-1}}, h_{q_j}].$$

The transformed matrix is, for example:

$$\begin{bmatrix} 1 & 0 & 0 & 0 & 0 & 0 & 0 \\ \vdots & \ddots & \vdots & \vdots & \vdots & \vdots & \vdots \\ 0 & 0 & 0 & 0 & 1 & 0 & 0 \\ \vdots & \vdots & \vdots & \ddots & \vdots & \vdots & \vdots \\ 0 & 0 & 1 & 0 & 0 & 0 & 0 \\ \vdots & \vdots & \vdots & \vdots & \vdots & \ddots & \vdots \\ 0 & 0 & 0 & 0 & 0 & 0 & 1 \end{bmatrix},$$

that is,
certain two rows of a unit matrix are exchanged. The transformed matrix is a symmetrical matrix, and an inverse matrix is the transformed matrix. Then, it can be known that:

$$J_v(\{s_1, s_2, \ldots, s_{v-1}, q_j\}) =$$

$$\left(I_v + \left(W_n^{\{s_1,s_2,\ldots,s_{v-1},q_j\}}\right)^H H^H H W_n^{\{s_1,s_2,\ldots,s_{v-1},q_j\}}\right)^{-1} =$$

$$(I_v + H_v^H(\{s_1, s_2, \ldots, s_{v-1}, q_j\})H_v(\{s_1, s_2, \ldots, s_{v-1}, q_j\}))^{-1} =$$

$$\left(I_v + [h_{s_1}, h_{s_2}, \ldots, h_{s_{v-1}}, h_{q_j}]^H [h_{s_1}, h_{s_2}, \ldots, h_{s_{v-1}}, h_{q_j}]\right)^{-1} =$$

$$\left(I_v + (P_1 P_2 \ldots P_K)^H [h_{q_1}, h_{q_2}, \ldots, h_{q_{v-1}}, h_{q_v}]^H [h_{q_1}, h_{q_2}, \right.$$
$$\left. \ldots, h_{q_{v-1}}, h_{q_v}] \cdot P_1 P_2 \ldots P_K\right)^{-1} = P_K P_{K-1} \ldots$$

$$P_1 (I_v + [h_{q_1}, h_{q_2}, \ldots, h_{q_{v-1}}, h_{q_v}]^H [h_{q_1}, h_{q_2}, \ldots, h_{q_{v-1}}, h_{q_v}])^{-1}$$

$$P_1 P_2 \ldots P_K =$$

$$P_K P_{K-1} \ldots P_1 J_v(\{q_1, q_2, \ldots, q_{v-1}, q_v\}) P_1 P_2 \ldots P_K;$$

thus obtaining:

$$J_v(\{q_1, q_2, \ldots, q_{v-1}, q_v\}) = (P_1 P_2 \ldots P_K) J_v(\{s_1, s_2, \ldots, s_{v-1}, q_j\})(P_K P_{K-1} \ldots P_1). \quad (4)$$

At the right end of formula (4), the transformed matrix only performs row and column transformation operations on $J_v(\{s_1, s_2, \ldots, s_{v-1}, q_j\})$, and no additional calculation is required. It can be known from formula (4) that, diagonal element sets of matrices $J_v(\{q_1, q_2, \ldots, q_{v-1}, q_v\})$ and $J_v(\{s_1, s_2, \ldots, s_{v-1}, q_j\})$ are the same, and only have different orders.

Through the preceding formula (4), the recursion calculation from the sequential set $\{s_1, s_2, \ldots, s_{v-1}\}$ to the sequential set $\{q_1, q_2, \ldots, q_{v-1}, q_v\}$ is solved.

A specific implementation process of the embodiments of the present invention is described in the following.

Specifically, taking index=0 as an example, in a process of calculating $SINR_k(v,W)$, a corresponding process of calculating an interference-plus-noise matrix is as shown in FIG. 1, and specifically includes:

Step 11: Obtain $J_1(\{1\})$ by calculation through formula (3).

Step 12: Obtain $J_2(\{1,4\})$ by calculation through formula (3).

Step 13: Obtain $J_3(\{1,4,2\})$ by calculation through formula (3).

Step 14: According to a calculation result of step 13, obtain $J_3(\{1,2,4\})$ by calculation through a transformation operation by formula (4).

Step 15: Obtain $J_4(\{1,2,4,3\})$ by calculation through formula (3).

Step 16: Based on a calculation result of step 15, obtain $J_4(\{1,2,3,4\})$ by calculation through a transformation operation by formula (4).

So far, $SINR_k(v,W)$ corresponding to all layers and all precoding matrices may be calculated by using formulas (3) and (4).

In this embodiment of the present invention, a corresponding processing process of reporting the PMI and the RI is further provided, that is, a process of reporting the PMI and the RI by a corresponding LTE system may specifically include any of the following processing manners.

(1) Processing Manner 1

When only the PMI is reported, RI=1, and at this time, $$SINR_1(v, W) = \frac{W^H H^H H W}{\sigma^2}$$

at each sub-carrier may be directly calculated, so that an optimal PMI is selected.

(2) Processing Manner 2

Both the PMI and the RI are reported, and at this time, each $SINR_k(v,W)$ ($k=1, 2, \ldots, v$) at each sub-carrier may be calculated in the foregoing manner, thus obtaining an effective SINR of each codeword stream through conversion, and then the optimal PMI and RI are selected according to a maximum throughput $$\max_{(v,W)} Throughput(v, W).$$

(3) Processing Manner 3

Only the RI is reported, and at this time, the optimal PMI and RI may be selected by using the method in the processing manner 2, but only the corresponding RI is reported.

To sum up, in a joint estimation algorithm of the PMI and the RI provided in the embodiment of the present invention, the corresponding calculation amount is reduced by one magnitude. Specifically, when the number of transmission antennas is 4 or larger, the effect for reducing the calculation amount is quite significant. Meanwhile, in this embodiment of the present invention, algorithms of the two cases where the RI is reported and both the PMI and RI are reported are unified, so that an algorithm of selecting the RI does not need to be separately developed, thus reducing the implementation complexity.

The embodiments of the present invention may specifically be applicable to an LTE system and an evolution protocol based on the LTE system. Meanwhile, the embodiments of the present invention are not only applicable to an LTE multi-carrier system, but also applicable to an LTE single carrier system having the same precoding feature.

Those of ordinary skill in the art may understand that, all or a part of processes in the method in the preceding embodiments may be accomplished by relevant hardware under instructions of a computer program. The program may be stored in a computer-readable storage medium. When the program runs, the processes in the method in the preceding embodiments are performed. The storage medium may be a magnetic disk, an optical disk, a Read-Only Memory (ROM) or a Random Access Memory (RAM).

Figure 2:
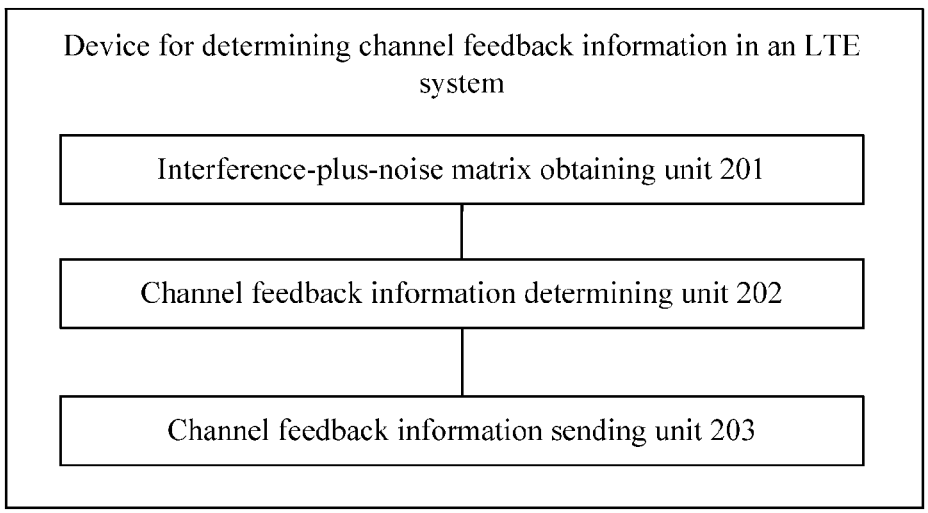
FIG. 2 is a schematic structural diagram of a device according to an embodiment of the present invention.

An embodiment of the present invention provides a device for determining channel feedback information in an LTE system, which has a specific implementation structure as shown in FIG. 2, and may include:

an interference-plus-noise matrix obtaining unit 201, configured to obtain an $(N-1)^{th}$ layer interference-plus-noise matrix in an LTE system, and obtain an $N^{th}$ layer interference-plus-noise matrix according to the $(N-1)^{th}$ layer interference-plus-noise matrix; and a channel feedback information determining unit 202, configured to calculate an SINR corresponding to the $N^{th}$ layer interference-plus-noise matrix according to the $N^{th}$ layer interference-plus-noise matrix obtained by the interference-plus-noise matrix obtaining unit 201, and determine channel feedback information according to the SINR, where N is an integer that is greater than 1.

Furthermore, a calculation formula for obtaining the $N^{th}$ layer interference-plus-noise matrix by the interference-plus-noise matrix obtaining unit 201 according to the $(N-1)^{th}$ layer interference-plus-noise matrix includes:

the $N^{th}$ layer interference-plus-noise matrix $$J_v = \begin{bmatrix} J_{v-1} + t_5 & -t_4 \\ -t_4^H & t_3 \end{bmatrix},$$

where v is the number of layers, $$\begin{cases} t_1 = J_{v-1}\alpha \\ t_2 = \alpha^H t_1 \\ t_3 = (b-t_2)^{-1}, \alpha = H_{v-1}^H h_v, b = 1 + h_v^H h_v, \text{ and} \\ t_4 = t_3 t_1 \\ t_5 = t_4 t_1^H \end{cases}$$

$H_v = [h_1, h_2, \ldots, h_v].$

In the preceding device, the corresponding channel feedback information may include a PMI and an RI, and the device further includes a channel feedback information sending unit 203, configured to report only the PMI when RI=1; or report the PMI and the RI at the same time; or report only the RI.

Through the preceding device, the corresponding calculation amount in a joint estimation algorithm of the PMI and the RI may be reduced by one magnitude, thus reducing the complexity of the corresponding calculation process.

The preceding descriptions are only exemplary specific embodiments of the present invention, but are not intended to limit the protection scope of the present invention. All modifications and variations that are easily thought by persons skilled in the art in the technical scope disclosed in the present invention shall fall within the protection scope of the present invention. Therefore, the protection scope of the present invention shall be subject to that of the appended claims.

What is claimed is:

1. A method for determining channel feedback information in an LTE system, comprising:
    obtaining an $(N-1)^{th}$ layer interference-plus-noise matrix in an LTE system, and obtaining an $N^{th}$ layer interference-plus-noise matrix according to the $(N-1)^{th}$ layer interference-plus-noise matrix; and
    calculating an SINR corresponding to the $N^{th}$ layer interference-plus-noise matrix according to the $N^{th}$ layer interference-plus-noise matrix, and determining channel feedback information according to the SINR, wherein N is an integer that is greater than 1.

2. The method according to claim 1, wherein a calculation formula for calculating the $N^{th}$ layer interference-plus-noise matrix according to the $(N-1)^{th}$ layer interference-plus-noise matrix comprises:
    the $N^{th}$ layer interference-plus-noise matrix $$J_v = \begin{bmatrix} J_{v-1} + t_5 & -t_4 \\ -t_4^H & t_3 \end{bmatrix},$$

wherein v is the number of layers, $$\begin{cases} t_1 = J_{v-1}\alpha \\ t_2 = \alpha^H t_1 \\ t_3 = (b-t_2)^{-1}, \alpha = H_{v-1}^H h_v, b = 1 + h_v^H h_v, \text{ and} \\ t_4 = t_3 t_1 \\ t_5 = t_4 t_1^H \end{cases}$$

$H_v = [h_1, h_2, \ldots, h_v],$ wherein H is a channel transmission matrix.

3. The method according to claim 1, wherein the channel feedback information comprises a Precoding Matrix Indicator (PMI) and Rank Indication (RI), and the method further comprises:
    reporting only the PMI when RI=1; or reporting the PMI and the RI at the same time; or reporting only the RI.

4. A device for determining channel feedback information in an LTE system, comprising:
    an interference-plus-noise matrix obtaining unit, configured to obtain an $(N-1)^{th}$ layer interference-plus-noise matrix in an LTE system, and obtain an $N^{th}$ layer interference-plus-noise matrix according to the $(N-1)^{th}$ layer interference-plus-noise matrix; and
    a channel feedback information determining unit, configured to calculate an SINR corresponding to the $N^{th}$ layer interference-plus-noise matrix according to the $N^{th}$ layer interference-plus-noise matrix obtained by an interference-plus-noise matrix obtaining unit through calculation, and determine channel feedback information according to the SINR, wherein N is an integer that is greater than 1.

5. The device according to claim 4, wherein a calculation formula for calculating the $N^{th}$ layer interference-plus-noise matrix by the interference-plus-noise matrix obtaining unit according to the $(N-1)^{th}$ layer interference-plus-noise matrix comprises:
    the $N^{th}$ layer interference-plus-noise matrix $$J_v = \begin{bmatrix} J_{v-1} + t_5 & -t_4 \\ -t_4^H & t_3 \end{bmatrix},$$

wherein v is the number of layers, $$\begin{cases} t_1 = J_{v-1}\alpha \\ t_2 = \alpha^H t_1 \\ t_3 = (b-t_2)^{-1}, \alpha = H_{v-1}^H h_v, b = 1 + h_v^H h_v, \text{ and} \\ t_4 = t_3 t_1 \\ t_5 = t_4 t_1^H \end{cases}$$

$H_v = [h_1, h_2, \ldots, h_v].$

6. The device according to claim 4, wherein the channel feedback information comprises a Precoding Matrix Indicator (PMI) and Rank Indication (RI), and the device further comprises a channel feedback information sending unit, configured to report only the PMI when RI=1; or report the PMI and the RI at the same time; or report only the RI.

7. A non-transitory computer-readable medium having computer executable instructions for causing a computer to perform steps comprising:
    obtaining an $(N-1)^{th}$ layer interference-plus-noise matrix in an LTE system, and obtaining an $N^{th}$ layer interference-plus-noise matrix according to the $(N-1)^{th}$ layer interference-plus-noise matrix; and
    calculating an SINR corresponding to the $N^{th}$ layer interference-plus-noise matrix according to the $N^{th}$ layer interference-plus-noise matrix, and determining channel feedback information according to the SINR, wherein N is an integer that is greater than 1.

* * * * *